US012109728B2

(12) United States Patent
Crawford

(10) Patent No.: US 12,109,728 B2
(45) Date of Patent: Oct. 8, 2024

(54) PORTABLE MIXING APPARATUS FOR MIXING COMPONENTS

(71) Applicant: Andrew Crawford, Cwmbran (GB)

(72) Inventor: Andrew Crawford, Cwmbran (GB)

( * ) Notice: Subject to any disclaimer, the term of this patent is extended or adjusted under 35 U.S.C. 154(b) by 884 days.

(21) Appl. No.: 17/272,977

(22) PCT Filed: Sep. 4, 2019

(86) PCT No.: PCT/GB2019/052466
§ 371 (c)(1),
(2) Date: Mar. 3, 2021

(87) PCT Pub. No.: WO2020/049298
PCT Pub. Date: Mar. 12, 2020

(65) Prior Publication Data
US 2021/0331349 A1 Oct. 28, 2021

(30) Foreign Application Priority Data
Sep. 4, 2018 (GB) ..................................... 1814318

(51) Int. Cl.
*B28C 5/00* (2006.01)
*B01F 29/63* (2022.01)
(Continued)

(52) U.S. Cl.
CPC ............ *B28C 5/0856* (2013.01); *B01F 29/63* (2022.01); *B01F 33/5014* (2022.01); *B28C 5/1887* (2013.01)

(58) Field of Classification Search
CPC ............................... B01F 29/63; B28C 5/1887
See application file for complete search history.

(56) References Cited

U.S. PATENT DOCUMENTS 3,084,917 A 4/1963 Graybill
3,173,665 A * 3/1965 Hall ...................... B28C 5/1887 366/47

(Continued)

FOREIGN PATENT DOCUMENTS

CN 204710151 U 10/2015
CN 204841525 U 12/2015

(Continued)

*Primary Examiner* — Anshu Bhatia
(74) *Attorney, Agent, or Firm* — Standley Law Group LLP; Beverly A. Marsh; Kenny W. Pung

(57) ABSTRACT

A portable mixing apparatus for mixing components is disclosed. The apparatus comprises a container for receiving components to be mixed, a frame for supporting the container in a first orientation for mixing components and a driving assembly couplable with the container for rotating the container. The frame comprises: a first handle for gripping with a first hand of a user, the first handle being disposed above a centre of mass of the portable mixing apparatus, when orientated in the first orientation, the first handle extending forwardly of the apparatus over the container; a second handle for gripping with a second hand of the user while the first hand grips the first handle, the second handle being disposed below the centre of mass of the portable mixing apparatus when orientated in the first orientation, the first and second handle being arranged to enable the user to carry the mixing apparatus and re-orientate the apparatus between the first orientation and a second orientation for emptying the components from the container.

17 Claims, 8 Drawing Sheets

(51) Int. Cl.

| | |
|---|---|
| ***B01F 33/501*** | (2022.01) |
| ***B28C 5/08*** | (2006.01) |
| ***B28C 5/18*** | (2006.01) |

(56) References Cited

U.S. PATENT DOCUMENTS

| | | | | |
|---|---|---|---|---|
| 4,197,015 A * | 4/1980 | Moser | .................. | B28C 5/1887 366/63 |
| 4,223,997 A | 9/1980 | Violet et al. | | |

FOREIGN PATENT DOCUMENTS

| | | |
|---|---|---|
| EP | 3311968 A1 | 4/2018 |
| GB | 1311415 A | 3/1973 |
| GB | 1517535 A | 7/1978 |

* cited by examiner

PORTABLE MIXING APPARATUS FOR MIXING COMPONENTS

The present invention relates to a portable mixing apparatus and in particular to a portable mixing apparatus for mixing components.

It is known to provide a variety of tools adapted for home, “do-it-yourself” applications such as building alterations, gardening, farming etc. which are typically conducted on a small scale. To ensure that such tools are useful and practical, they need to fulfil a number of requirements. It is not uncommon that industrial or professional equipment fails to satisfy at least some of these conditions, thereby causing practical problems or even rendering it unsuitable for home usage or other small scale applications.

For example, equipment typically used for mixing components or materials, such as concrete mixing equipment, is often cumbersome. Such devices may be provided in the form of mixing trucks capable of delivering high volumes of concrete, as well as on-site concrete mixers for smaller scale works. These known on-site mixers, although substantially smaller than trucks, are still cumbersome and bulky, making it difficult for a single person to easily transport them. Furthermore, they usually take substantial space when stored in a garage, for example. For applications smaller in scale than those in which typical on-site concrete mixers are used, the user is required to mix concrete on a board for example, which can be very time consuming and may often lead to poorly mixed components.

There are other examples of small scale applications such as gardening or farming, in which a need arises to combine or mix materials, organic matter or other components on a small scale, in a time efficient manner, and without requiring costly or cumbersome equipment.

It is an object of the present invention to provide a technical solution to overcome at least some of the issues described above.

In accordance with a first aspect of the present invention, there is provided a portable mixing apparatus for mixing components, comprising: a container for receiving components to be mixed, a frame for supporting the container in a first orientation for mixing components, a driving assembly couplable with the container for rotating the container, wherein the frame comprises: a first handle for gripping with a first hand of a user, the first handle being disposed above a centre of mass of the portable mixing apparatus when orientated in the first orientation, the first handle being extending forwardly of the apparatus, over the container; a second handle for gripping with a second hand of the user while the first hand grips the first handle, the second handle being disposed below the centre of mass of the portable mixing apparatus when orientated in the first orientation, wherein the first and second handle being arranged to enable a user to carry the mixing apparatus and to re-orientate the apparatus between the first orientation and a second orientation for emptying the components from the container.

In an embodiment, in the first orientation, the first handle is disposed substantially vertically above the second handle.

In an embodiment, when the apparatus is arranged in the first orientation, the first handle and second handle are disposed upon a vertical axis which is displaced rearwardly of the centre of mass of the apparatus.

In an embodiment, when the apparatus is arranged in the first orientation, the first handle and second handle are disposed upon a vertical axis which extends through the centre of mass of the apparatus.

In an embodiment, the second handle is disposed toward a rear of the apparatus. The first handle is disposed forwardly of a vertical axis comprising the centre of mass, and the second handle is disposed rearwardly of the vertical axis.

In an embodiment, the container comprises a substantially cylindrical drum. The drum comprises a diameter in the range of 200 mm-500 mm, preferably in the range of 300 mm-400 mm, and more preferably in the range of 330 mm-370 mm.

In an embodiment, when the apparatus is arranged in the first orientation, the frame is adapted to support the container for rotation about a rotational axis which is inclined relative to a horizontal axis.

In an embodiment, the first handle is orientated substantially orthogonally relative to the second handle.

In an embodiment, the first handle is arranged in a substantially parallel configuration with the second handle. In an embodiment, the first handle extends substantially perpendicular to a rotational axis of the container.

In an embodiment, the container is fixedly coupled with the driving assembly.

In an embodiment, the container further comprises at least one mixing paddle disposed within the container. In an embodiment the container comprises an opening, and wherein a portion of a side wall of the container is tapered towards the opening. The opening comprises a diameter in the range of 150 mm-450 mm, preferably in the range of 250 mm-350 mm, and more preferably in the range of 300 mm-320 mm.

In an embodiment, the container is formed of durable and watertight material.

In an embodiment, the driving assembly comprises a motor coupled with the container, the motor being disposed outside of the container.

In an embodiment, the container and the motor are coupled via a driving shaft.

In an embodiment, the motor comprises an electric motor adapted to be powered with mains electricity.

In an embodiment, the overall height of the apparatus, when configured in the first configuration, is less than 1000 mm, preferably less than 800 mm. In an embodiment, the overall height of the apparatus, when configured in the first configuration, is substantially 600 mm.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described with reference to the accompanying drawings, in which.

Figure 1:
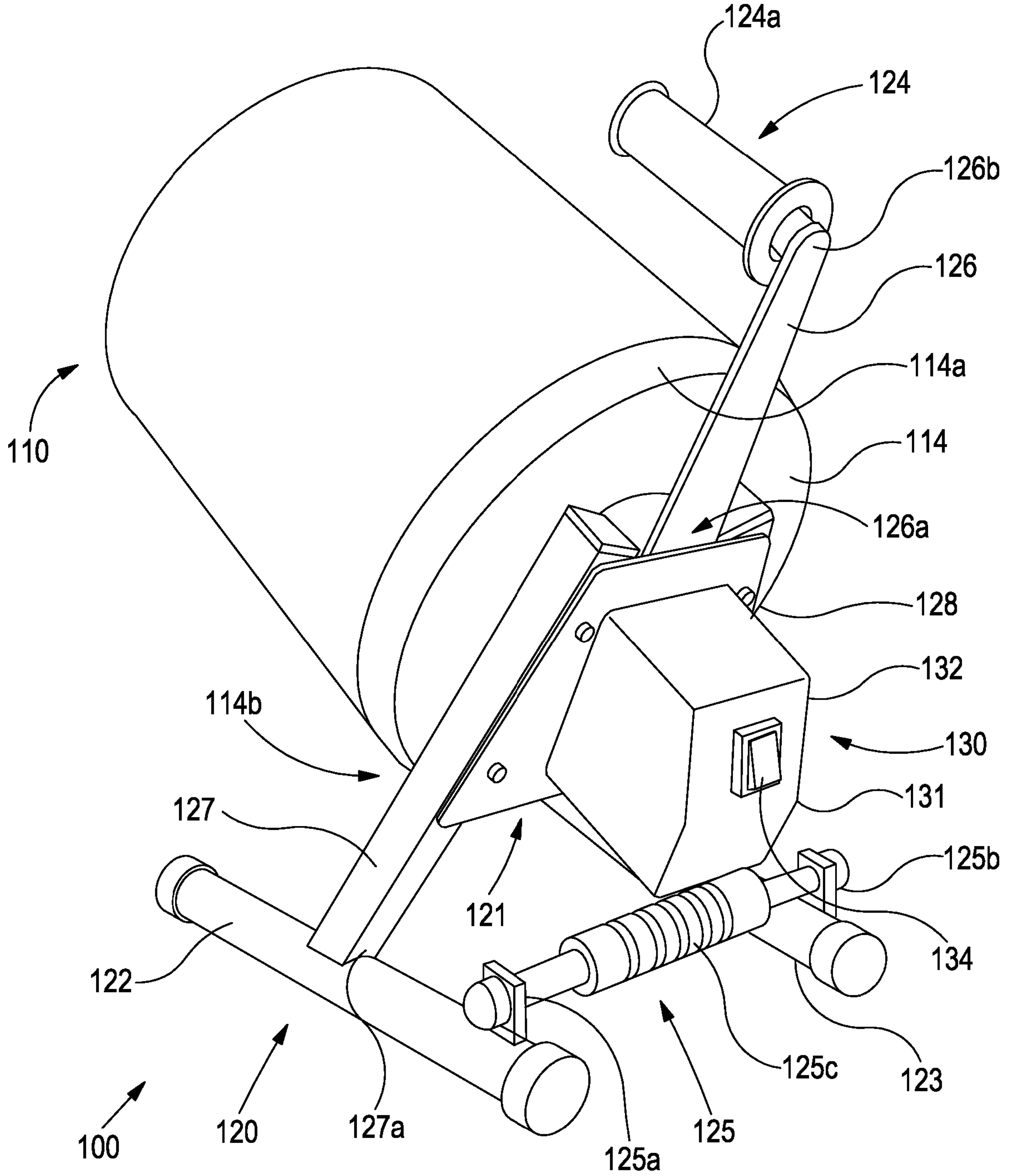
FIG. 1 shows a perspective view of a portable mixing apparatus in a first orientation, according to an embodiment of the present invention.
Figure 2:
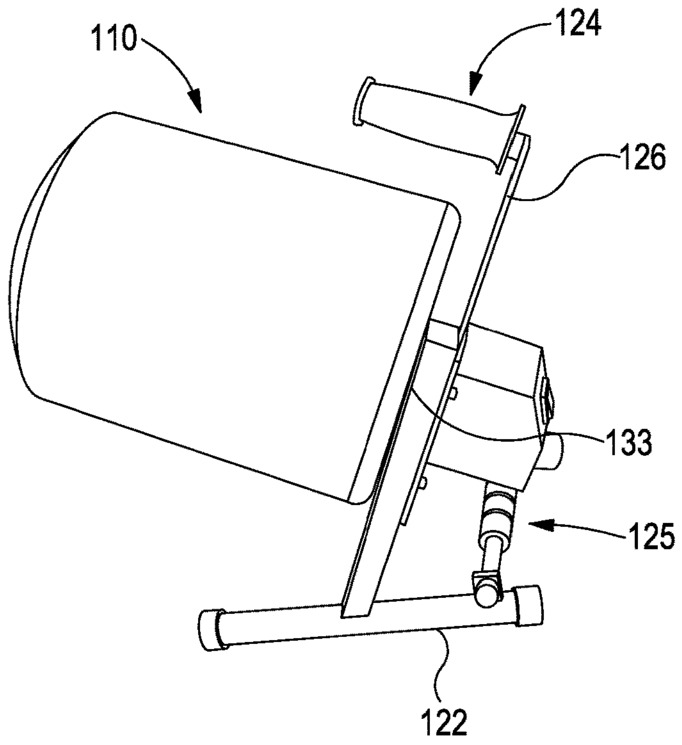
FIG. 2 shows a side view of a portable mixing apparatus of FIG. 1.
Figure 3:
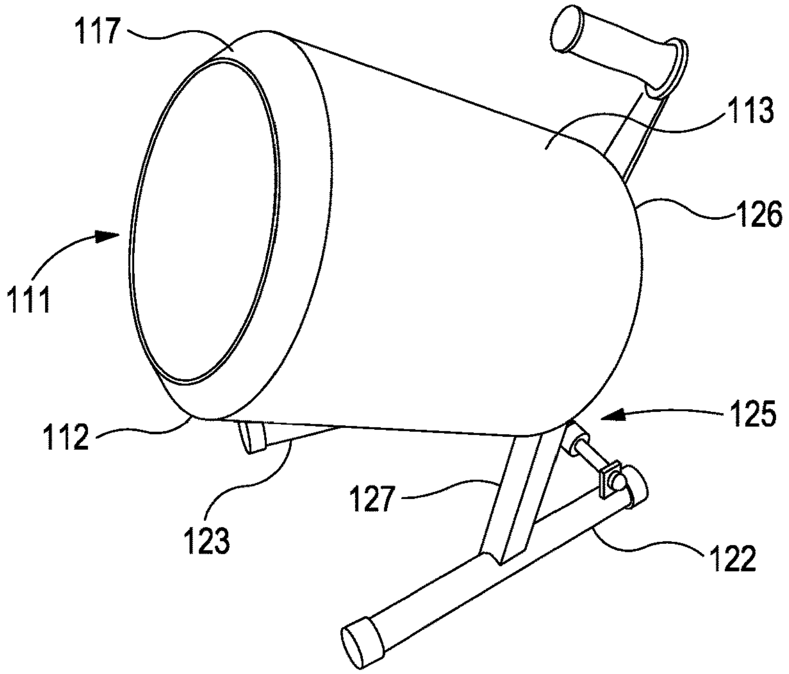
FIG. 3 shows a perspective view of a portable mixing apparatus of FIGS. 1-2, with opening of the container visible.

FIGS. 1 to 4 illustrate a portable mixing apparatus 100 according to a first embodiment of the present invention, for mixing components. The apparatus 100 may be used for mixing various materials. In construction-related applications for example, the apparatus 100 may be used to mix and combine aggregates to prepare cement, mortar or concrete, for example. The apparatus 100 may also be used and be adapted to mix materials used in farming or gardening.

The apparatus 100 is portable and handheld, i.e. it comprises technical and functional features enabling it to be lifted, carried and operated by a single person. The portable mixing apparatus 100 comprises a container 110 for receiving components to be mixed. The container 110 comprises a substantially cylindrical drum 110 having a diameter in the range of 200-500 mm, preferably 300-400 mm and more preferably 320-370 mm. The drum 110 comprises an opening 111 disposed within a first end wall 112 thereof, through which components to be mixed can be loaded into the container 110. The opening 111 comprises a circular shape and comprises a diameter in the range of 150-450 mm, preferably 250-350 mm and more preferably 300-320 mm. A portion 117 of a side wall 113 of the container is tapered towards the opening 111. The container 110 further comprises at least one mixing paddle 116 disposed within the container 110. In particular, the mixing paddle 116 may be attached to the side wall 113 within the container 110. In another example, two mixing paddles 116 may be attached to the side wall 113. The container 110 is formed of durable and watertight material, such as metal or plastics material, although other materials may also be used depending on the particular application of the mixing apparatus 100.

The apparatus 100 further comprises a frame 120 for supporting the container 110 in a first orientation for mixing components. When the apparatus 100 is arranged in the first orientation, the frame 120 is adapted to support the container 110 for rotation about a rotational axis 115 which is inclined relative to a horizontal axis 118. The frame 120 comprises a central support bracket 121 couplable with the container 110 via a mounting (not shown) disposed at the centre of a second end wall or base 114 of the container 110. The frame 120 may further comprise a first and second ground-engaging foot 122, 123 attached to the central support bracket 121 via respective first and second leg 127, 128. Each foot 122, 123 is coupled with the respective leg by welding 127*a*, for example.

Figure 4:
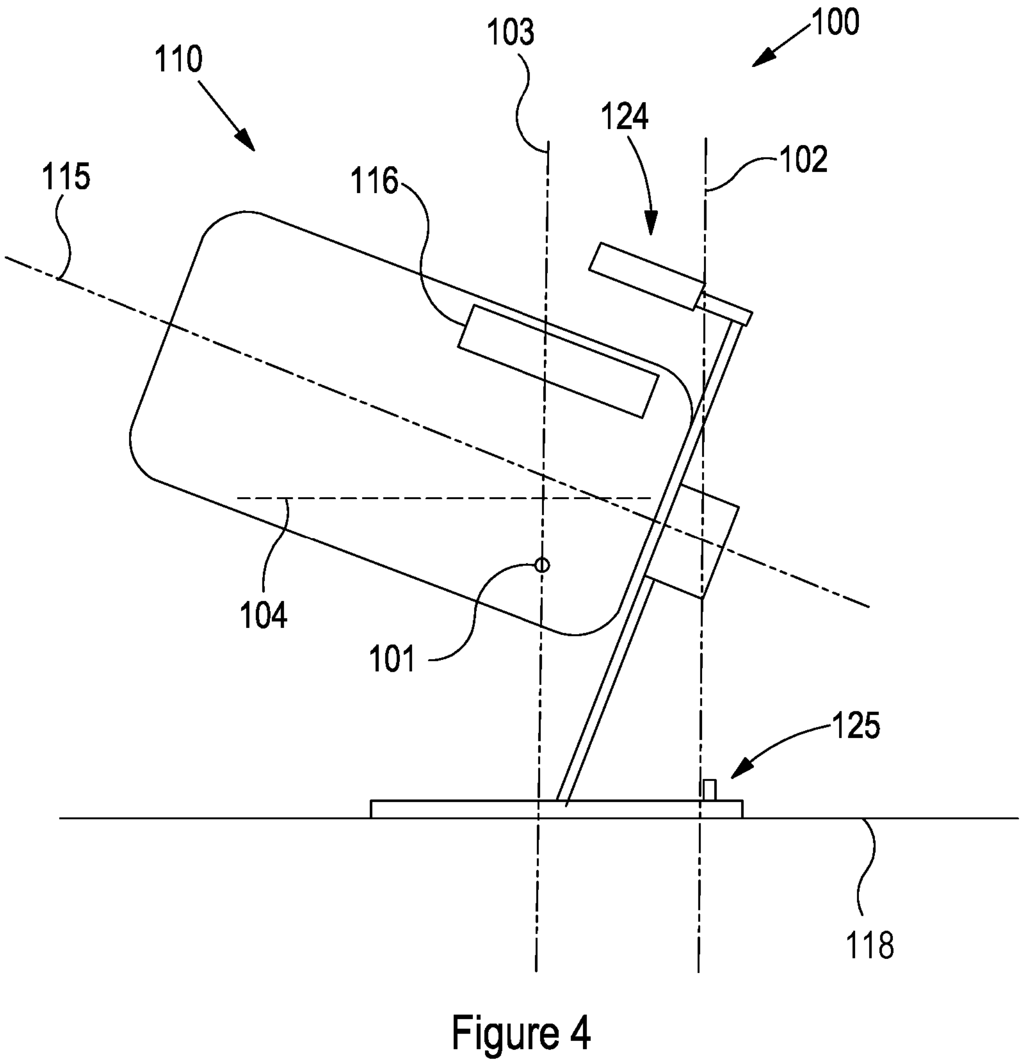
FIG. 4 shows a cross sectional view of the portable mixing apparatus of FIGS. 1 to 3.

In a first embodiment, the frame further comprises a first handle 124 for gripping with a first hand of a user. The first handle 124 is disposed above a centre 101 of mass of the portable mixing apparatus 100 when orientated in the first orientation and extends forwardly of the apparatus over the drum 110. A second handle 125, for gripping with a second hand of the user while the first hand grips the first handle 124, is disposed below the centre 101 of mass of the portable mixing apparatus 100 when orientated in the first orientation. The first and second handles 124, 125 are arranged to enable a user to re-orientate the apparatus 100 between the first orientation and a second orientation for emptying the components from the container 110 via the opening 111. It is to be noted that the centre 101 of mass illustrated in FIG. 4 is an example only, and the location thereof may vary slightly depending on whether the container 110 is loaded with components or mixture, for example. The first handle 124 and second handle 125 may be positioned substantially on a same vertical axis 102, and the first handle 124 may be substantially orthogonally orientated relative to the second handle 125. A first end 125*a* of the second handle 125 may be coupled with the first foot 122 and a second end 125*b* of the second handle 125 may be coupled with the second foot 123. The second handle 125 may be coupled with the respective feet 122, 123 by welding or may be detachably couplable through screwing the handle 125 to the feet 122, 123, for example.

The frame 120 further comprises an arm 126 extending from the central support bracket 121, over a periphery 114*a* of the container 110, the arm 126 is coupled at a proximal end 126*a* with the central support bracket 121, and at a distal end 126*b* thereof with the first handle 124. The arm 126, first and second legs 127, 128 and the central support bracket 121 are fixedly coupled together so that the distal end 126*b* of the arm 126 and distal ends of the legs 127, 128 define a triangle. The first handle 124 extends substantially perpendicular to a longitudinal axis of the arm 126, and may be integrated with the arm 124 or detachably couplable by screwing to the arm 126, for example. The first handle 124 extends substantially parallel to the rotational axis 115 of the container 110 and the second handle 125 extends substantially parallel to the base 114 of the container 110. The first and second handles 124, 125 respectively comprise a rubber grip 124*a*, 125*c* for facilitating handling and control of the apparatus 100. A displacement or spatial arrangement of the first and second handle 124, 125 relative to the container 110 allows the user to lift, carry and unload the portable mixing apparatus 100.

Figure 5:
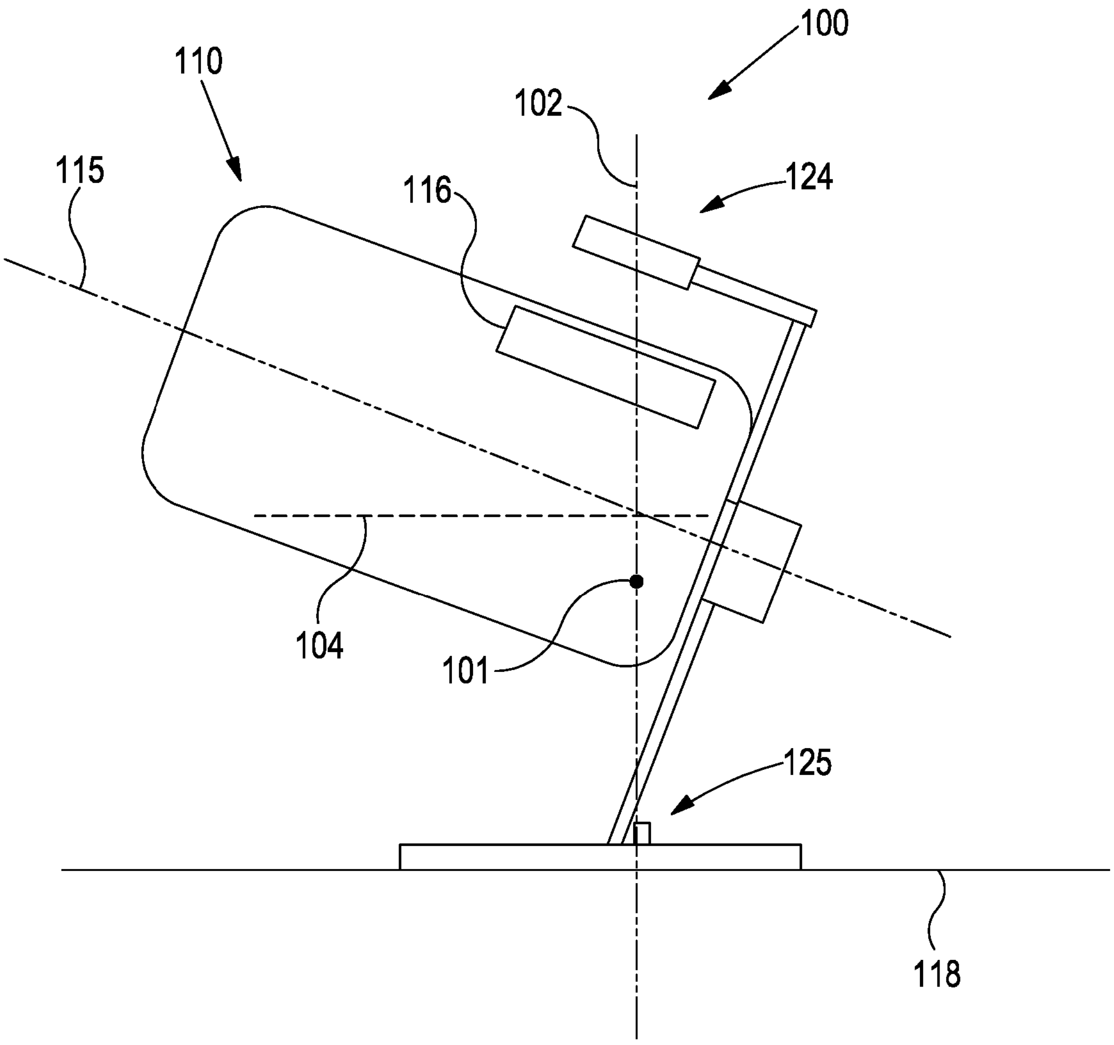
FIG. 5 shows another example of a cross sectional view of the portable mixing apparatus, in a first orientation.
Figure 6:
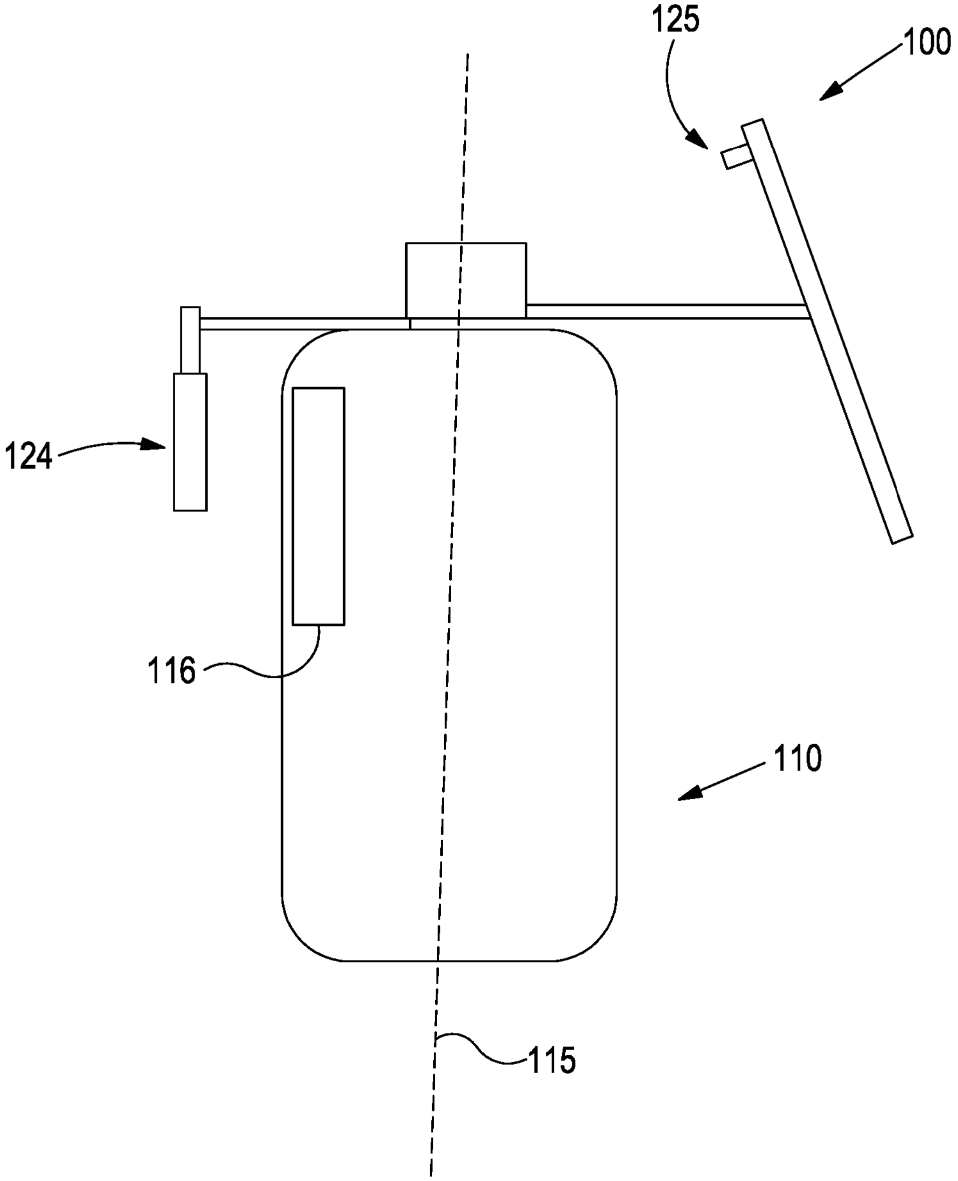
FIG. 6 shows a cross sectional view of the portable mixing apparatus in a second orientation.

When the apparatus 100 is arranged in the first orientation, the first handle 124 and second handle 125 may be disposed upon a vertical axis 102 which may be displaced rearwardly of the centre 101 of mass of the apparatus 100. Alternatively, as illustrated in the FIG. 5, the vertical axis 102 may also extend substantially through the centre of mass 101 of the apparatus when the apparatus 100 is in the first orientation.

The apparatus 100 further comprises a driving assembly 130 couplable with the container 110 for rotating the container 110. In an example, the driving assembly 130 is fixedly coupled with the container 110. In the illustrated embodiment, the driving assembly 130 comprises a motor 131 coupled with the container 110, the motor 131 being disposed outside of the container 110 and within a housing 132, for example. The container 110 and the motor 131 are coupled via a driving shaft 133 which may extend through a centre of the base 114 of the container 110. The container 110 may be fixedly or detachably coupled with the driving shaft 133 so that, in use, the motor 131 drives the rotation of the driving shaft 133 which in turn rotates the container 110 about the longitudinal (namely the rotational) axis thereof. The motor 131 may comprise an electric motor 131 adapted to be powered with mains electricity, or may comprise an internal battery for powering the apparatus 100 in a wireless form. The motor 131 may also be adapted to be powered from a power source located in a vehicle. For example, this may be a vehicle battery or vehicle engine. The power from the vehicle may be delivered via automobile accessory power delivery means for example, such as cigarette lighter socket. In other examples, the motor 131 may comprise a direct current connection, for example for use with a vehicle's electrical supply. The motor 131 may further comprise a switch 134.

Figure 7:
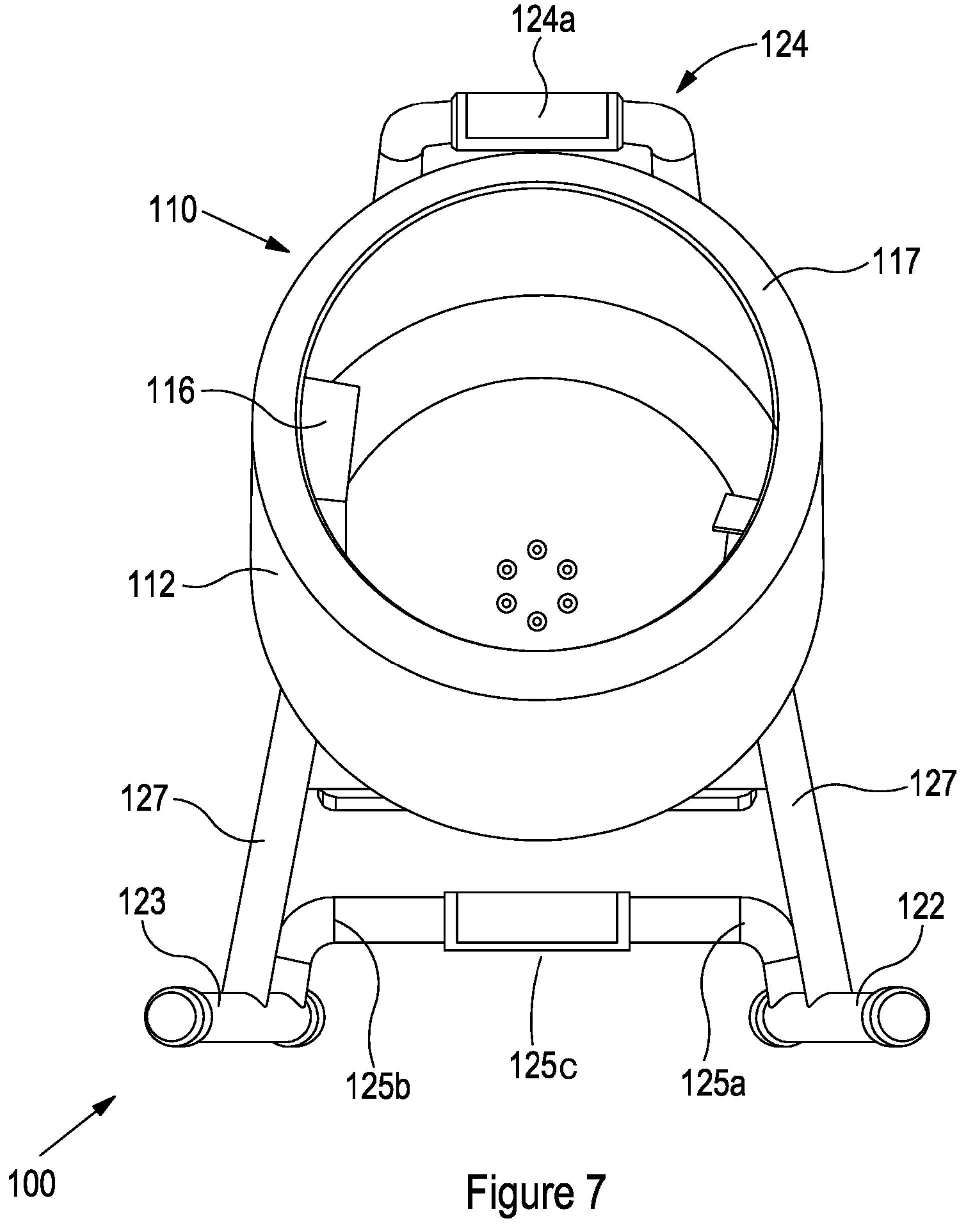
FIG. 7 shows a front view of an alternative portable mixing apparatus according to an embodiment of the present invention.
Figure 8:
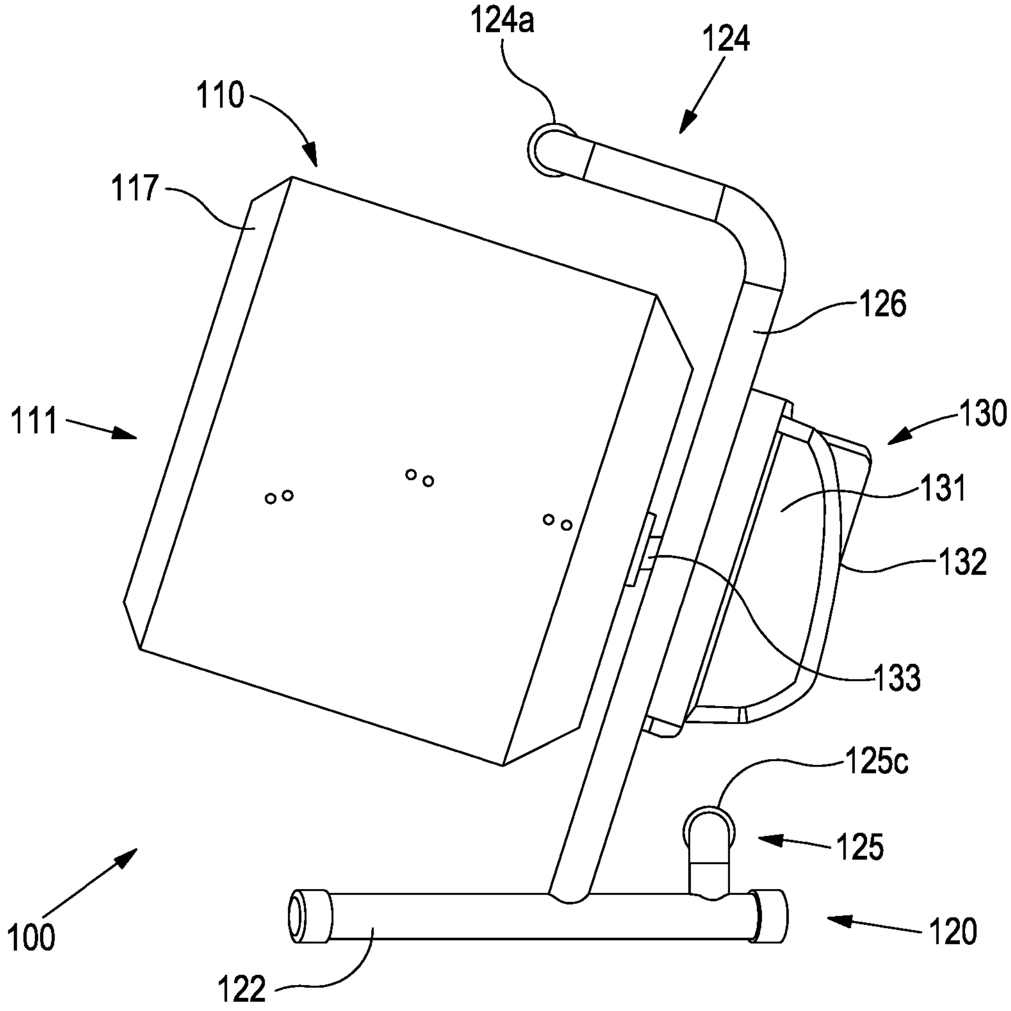
FIG. 8 shows a side view of the portable mixing apparatus illustrated in FIG. 7.
Figure 9:
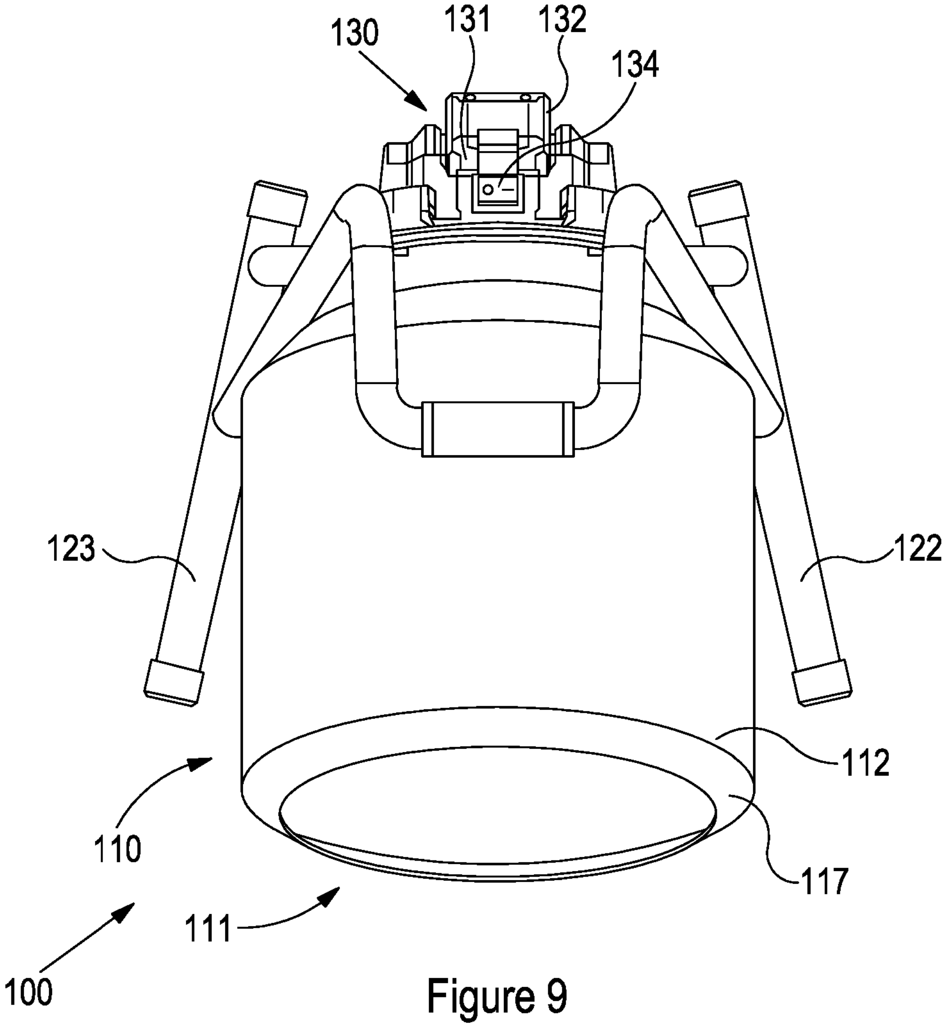
FIG. 9 shows plan view of the portable mixing apparatus illustrated in FIG. 7.

Referring to FIGS. 7, 8 and 9 of the drawings, there is illustrated a mixing apparatus 100' according to a second embodiment of the present invention. The apparatus 100 of the second embodiment is substantially the same as the apparatus 100 of the first embodiment and so like feature have been referenced with the same numerals. In this embodiment however, the first and second handles 124, 125 extend substantially parallel with each other, and substantially perpendicular with the rotational axis of the container. In addition, the first handle is disposed forwardly of a vertical axis comprising the centre of mass of the apparatus and the second handle is disposed rearwardly of the vertical axis.

The apparatus 100 of the first and second embodiments has a size adapted for easy handling by a single person without significant physical effort and without requiring additional tools. In this respect, the maximum height of the apparatus 100 when configured in the first orientation, does not exceed 1000 mm and is preferably less than 800 mm. In the illustrated embodiments, the height of the apparatus when configured in the first orientation is substantially 600 mm.

The apparatus 100 may be operated as follows. With the apparatus orientated in first orientation, the container 110 may be loaded with suitable materials for mixing, for example. In particular, cement, aggregate such as sand or gravel, and water may be loaded into the container 110 via the opening 111. The apparatus 100 may then be connected to the mains and subsequently switched on via the switch 134. The motor 131 then drives the driving shaft 133 which in turn rotates the container 110 about the longitudinal axis thereof. The components within the container are thereby mixed, and agitated by the mixing paddles 116. When the desired mixture is ready, the user grips the first handle 124 with one hand, grips the second handle 125 with their other hand, and lifts the apparatus 100. The improved control and facilitated handling achieved by a spatial displacement and arrangement of the first and second handles 124, 125 relative to the container 110 enables easy carrying and re-orienting the apparatus 100 into a second orientation, through tilting the apparatus 100 for example, so as to direct the opening 111 towards the desired unloading location where the mixture from the container 110 may be unloaded. In particular, carrying, handling and unloading of the apparatus 100 may be performed while the apparatus 100 is still connected to the mains and when the container 110 is rotating. This further facilitates unloading of the mixture, particularly when the mixture is particularly sticky.

The invention claimed is:

1. A portable mixing apparatus for mixing components, comprising:

a container for receiving components to be mixed, a frame for supporting the container in a first orientation for mixing components, a driving assembly couplable with the container for rotating the container, wherein the frame comprises:

a first handle for gripping with a first hand of a user, the first handle being disposed above a centre of mass of the portable mixing apparatus, when orientated in the first orientation, the first handle extending forwardly of the apparatus over the container;

a second handle for gripping with a second hand of the user while the first hand grips the first handle, the second handle being disposed below the container of the portable mixing apparatus when the apparatus is orientated in the first orientation, the second handle being substantially horizontal and extending substantially perpendicularly to the rotational axis of the container;

the first and second handle being arranged to enable the user to carry the mixing apparatus and re-orientate the apparatus between the first orientation and a second orientation for emptying the components from the container;

wherein, when the apparatus is arranged in the first orientation, the first handle and second handle are disposed upon a vertical axis which is displaced rearwardly of the centre of mass of the apparatus.

2. The portable mixing apparatus according to claim 1, wherein, in the first orientation, the first handle is disposed substantially vertically above the second handle.

3. The portable mixing apparatus according to claim 1, wherein the second handle is disposed toward a rear of the apparatus.

4. The portable mixing apparatus according to claim 1, wherein the container comprises a substantially cylindrical drum.

5. The portable mixing apparatus according to claim 4, wherein the drum comprises a diameter in the range of 200 mm-500 mm.

6. The portable mixing apparatus according to claim 1, wherein when the apparatus is arranged in the first orientation, the frame is adapted to support the container for rotation about a rotational axis which is inclined relative to a horizontal axis.

7. The portable mixing apparatus according to claim 1, wherein the first handle is orientated substantially orthogonally relative to the second handle.

8. The portable mixing apparatus according to claim 1, wherein the first handle is orientated in a substantially parallel configuration with the second handle.

9. The portable mixing apparatus according to claim 6 wherein the first handle extends substantially perpendicular to the rotational axis of the container.

10. The portable mixing apparatus according to claim 1, wherein the container is fixedly coupled with the driving assembly.

11. The portable mixing apparatus according to claim 1, wherein the container further comprises at least one mixing paddle disposed within the container.

12. The portable mixing apparatus according to claim 1, wherein the container comprises an opening and wherein a portion of a side wall of the container is tapered towards the opening.

13. The portable mixing apparatus according to claim 12, wherein the opening comprises a diameter in the range of 150 mm-450 mm.

14. The portable mixing apparatus according to claim 1, wherein the driving assembly comprises a motor coupled with the container, the motor being disposed outside of the container.

15. The portable mixing apparatus according to claim 14, wherein the container and the motor are coupled via a driving shaft.

16. The portable mixing apparatus according to claim 14, wherein the motor comprises an electric motor adapted to be powered with mains electricity.

17. The portable mixing apparatus according to claim 1, wherein the overall height of the apparatus, when configured in the first configuration, is less than 1000 mm.

* * * * *